(12) United States Patent
Nentwig

(10) Patent No.: US 8,750,350 B2
(45) Date of Patent: Jun. 10, 2014

(54) TRANSMITTER WITH A VARIABLE SAMPLING RATE

(75) Inventor: Markus Nentwig, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 248 days.

(21) Appl. No.: 13/183,528

(22) Filed: Jul. 15, 2011

(65) Prior Publication Data

US 2013/0016761 A1    Jan. 17, 2013

(51) Int. Cl.
*H04B 1/38* (2006.01)
*H03D 1/04* (2006.01)

(52) U.S. Cl.
USPC .......................................... 375/219; 375/346

(58) Field of Classification Search
USPC ......... 375/219, 285, 295, 316, 346, 349–350; 455/114.1, 112.2, 63.1
See application file for complete search history.

(56) References Cited

U.S. PATENT DOCUMENTS

| 6,999,723 | B2 * | 2/2006 | Kusbel et al. ................ 455/63.1 |
| 8,300,680 | B2 * | 10/2012 | Pals et al. ...................... 375/219 |
| 2003/0198307 | A1 | 10/2003 | Neill et al. |
| 2006/0057970 | A1 | 3/2006 | Kusbel et al. .................. 455/69 |
| 2007/0116148 | A1 | 5/2007 | Lowe et al. |
| 2008/0081586 | A1 | 4/2008 | Sreerama et al. |
| 2009/0138745 | A1 | 5/2009 | Dorsey et al. |
| 2010/0316089 | A1 * | 12/2010 | Liu et al. ....................... 375/133 |
| 2010/0316098 | A1 | 12/2010 | Pals et al. |
| 2011/0200076 | A1 * | 8/2011 | Mu et al. ....................... 375/219 |
| 2011/0293054 | A1 * | 12/2011 | Skinner et al. ................ 375/371 |

FOREIGN PATENT DOCUMENTS

GB           2292867           3/1996

OTHER PUBLICATIONS

Charanjit Singh, Manjeet Singh Patterh and Sanjay Sharma, "Efficient Implementation of Sample Rate Converter", IJACSA, vol. 1, No. 6, pp. 36-41, Dec. 2010.*
Holma, Toskala: "LTE for UMTS: Evolution to LTE-Advanced", (p. 376), Apr. 25, 2011.
Harris, F., "Performance and Design of Farrow Filter used for Arbitrary Resampling", San Diego State University, 6 pgs, 1997.

* cited by examiner

*Primary Examiner* — Khanh C Tran
(74) *Attorney, Agent, or Firm* — Stanton IP Law

(57) ABSTRACT

The present invention presents a method and a system for mitigating effects of clock harmonics in the receiver. The receiving signal may be monitored in such a way that the interfering harmonic component is tracked. When the interfering frequency is found out, the system determines the clock or clocks in the transceiver which are contributing to the interfering spurious tone. After that, the contributing clock(s) frequency is selected so that the effect of the spurious tone in the receiving passband is minimized or mitigated. This is performed by selecting a suitable clock frequency resulting in the spurious tones all falling outside the receiver passband; or in an OFDM system, by choosing a clock frequency deriving the spurious tone straight onto a subcarrier signal frequency.

20 Claims, 4 Drawing Sheets

TRANSMITTER WITH A VARIABLE SAMPLING RATE

BACKGROUND OF THE INVENTION

1. Field of the Invention

The present invention relates to mobile communication networks, and especially to interference mitigation for transceivers applying full-duplex radio transmission.

2. Description of the Related Art

Full duplex radio transceivers are capable of transmitting and receiving radio signals simultaneously. A general structure for a radio frequency (RF) transmitter and receiver has been shown in FIG. 1. These RF parts generally locate between a modem and a TX/RX antenna. Also, the RF parts may be formed in a radio frequency integrated circuit (RFIC) which is marked as the dashed box in FIG. 1, besides a duplex filter 16a-b.

At first considering the receiving signal branch from an antenna 17, the received signal is directed to a duplex filter 16b having an appropriate predetermined bandwidth for the receiving signal. This weak signal is directed to an amplifier 15b. After the amplification the RF signal is down-converted to a baseband signal in a mixer 14b. Thereafter, the down-converted signal is filtered in a low-pass filter 13b. The resulting analogue signal is ready for analogue-digital conversion at relatively high sampling rate, performed by an A/D converter (ADC) 11b. The ADC needs a clock input and this is depicted by a clock 12b. The digitized high-sample signal is thereafter converted to a lower sampling rate in a sampling rate converter (or down-sampler) 10b. This signal can be fed to a demodulator block in the modem.

Correspondingly, the transmission path starting from the modulated digital signal coming out of the modem is at first converted to a higher sampling rate in a sampling rate converter (or up-sampler) 10a. The up-sampled signal is converter from the digital to analogue form in a digital-to-analogue converter (DAC) 11a. For this conversion, the DAC 11a needs some kind of a trigger signal, which can be provided by a digital clock 12a. For mitigating the effect of the harmonics generated by the DAC 11a, the signal is low-pass filtered in 13a and the baseband signal is upconverted in a mixer 14a. The local oscillator signals required by the mixers (14a-b) are left out from the figure. The RF signal is thus amplified in an amplifier 15a before it is fed to the antenna 17 through the duplex filter 16a.

A problem for such a RF module is that the TX clock 12a signal for the DAC 11a results in harmonic signal components emerging from the TX signal branch and these harmonics propagate along the circuit board as well as through air. These clock harmonics locate at multiples of the fundamental frequency of the clock signal, the amplitude of a harmonic decreasing as an order of the harmonic increases. While the TX signal itself is low-pass-filtered, a significant part of these harmonics may interconnect into the receiving path of the transceiver through other routes on the RFIC board. Though the amplitude of most of the interconnected harmonics is in a very low level, high gain in receiver's RF parts, especially in the amplifier 15b, may lead to a situation where the interfering signal level on the signal detection is sufficiently high in order to degrade the signal reception quality significantly.

The unwanted coupling of the signals from the TX parts to the RX parts may happen through substrate coupling on the circuit board or through magnetic coupling. Interference may emerge also from the power supplies or through any wiring such as ground wiring. For e.g. LTE signal transmission, even the spurious signal amplitudes between −100 . . . −90 dBm can noticeably degrade the signal reception quality.

In prior art, the clock harmonics have been suppressed by designing additional space between functional blocks when a single IC solution is concerned for the whole transceiver. Such spaces act as attenuators for the propagating RF interferences, and as the signal frequency increases, generally the dimensions for such spaces decrease. Regarding the power supplies, decoupling capacitors or shunt circuits can be used for separating the harmful interference sources from the rest of the circuit. Such components require additional silicon area which is an undesired effect because the size of the circuit is an important design criterion.

The jitter effect of the clock signal spreads the power of the clock harmonics over a wider bandwidth but this may cause significant degradation of performance for the functionalities of the ADC and DAC themselves. On the other hand, if the pulse width of the clock signal is altered, the level of individual harmonics may be controlled.

In prior art, methods for suppressing clock harmonics originating from a clock of a microprocessor have been presented. E.g. in US 2006/0057970, it concerns a method and a system for reducing effects of clock harmonic frequencies. The clock frequency of the microprocessor can be selected and also the passband of the receiver side can be selected according e.g. to a desired operational mode of the transceiver in a way that the spurious signals originating from the clock harmonics do not interfere with the transceiver passband signal.

In prior art, there has not been presented an efficient method for mitigating the effect of harmonics originating from the clock frequency defining the sample rate and operational frequency of the TX digital-to-analogue converter (DAC).

SUMMARY OF THE INVENTION

The present invention introduces a method for mitigating effects of spurious tones caused by clock signals in a transceiver, which comprises a transmitter and a receiver. The method comprises determining at least one clock signal which contributes to a creation of at least one spurious tone on a receiver signal path, at least one determined clock signal relating to an analog-digital, digital-analog and/or a sample rate converter of the transceiver, and further, selecting a frequency of the determined clock signal to mitigate the effect of spurious tones in operation of the receiver.

In one embodiment of the invention, the frequency of the determined clock signal is selected so that the created spurious tone falls outside the receiver bandwidth.

In one embodiment of the invention, the frequency of the determined clock signal is selected so that the created spurious tone falls substantially aligned with a subcarrier frequency of the receiver.

In one embodiment of the invention, the method further comprises measuring the spectrum of the received signal path, and if detecting a spurious tone in the spectrum, selecting the frequency of the determined clock signal based on the measured spurious tone.

In one embodiment of the invention, in the detecting step, an increase is detected in power spectral density at a frequency that falls substantially on a multiple of a frequency of the determined clock signal.

In one embodiment of the invention, in the determining step, at least two clock signals are determined whose linear combination fall substantially on the frequency of the spurious tone.

In one embodiment of the invention, in the determining step, the method further comprises determining the at least one clock signal based on a data table, comprising clock signal frequency values linked with created spurious tone frequency values, and/or subcarrier frequencies and/or limit frequencies of the receiver passband.

In one embodiment of the invention, a clock frequency of a Farrow-type sample rate converter is related to the clock frequency of the digital-analog converter.

In one embodiment of the invention, the mitigation of the effect of spurious tones is performed in each branch of a multiple branch receiver.

In one embodiment of the invention, the transmitter comprises a primary and a secondary clock for the digital-analog converter, with either one of the clocks in operation, and if detecting a spurious tone in the spectrum, switching between the primary and the secondary clocks.

According to another aspect of the invention, it comprises a system for mitigating effects of spurious tones caused by clock signals in a transceiver. The system comprises a transmitting signal branch, at least one receiving signal branch, at least one clock signal relating to an analog-digital, digital-analog and/or a sample rate converter of the transceiver, a controller configured to determine the at least one clock signal which contributes to a creation of at least one spurious tone on a receiver signal path, and the controller is configured to select a frequency of the determined clock signal to mitigate the effect of spurious tones in operation of the receiver.

In one embodiment of the invention, the system comprises the controller configured to select the frequency of the determined clock signal so that the created spurious tone falls outside the receiver bandwidth.

In one embodiment of the invention, the system comprises the controller configured to select the frequency of the determined clock signal so that the created spurious tone falls substantially aligned with a subcarrier frequency of the receiver.

In one embodiment of the invention, the system further comprises measuring means configured to measure the spectrum of the received signal path, and if the controller detects a spurious tone in the spectrum, the controller is configured to select the frequency of the determined clock signal based on the measured spurious tone.

In one embodiment of the invention, the system comprises the controller configured to detect an increase in power spectral density at a frequency that falls substantially on a multiple of a frequency of the determined clock signal, when detecting the spurious tone.

In one embodiment of the invention, the system comprises the controller configured to determine at least two clock signals whose linear combination fall substantially on the frequency of the spurious tone.

In one embodiment of the invention, the system further comprises a data table, and the controller is configured to determine the at least one clock signal based on the data table, comprising clock signal frequency values linked with created spurious tone frequency values, and/or subcarrier frequencies and/or limit frequencies of the receiver passband.

In one embodiment of the invention, the system further comprises a Farrow-type sample rate converter whose clock frequency is related to the clock frequency of the digital-analog converter.

In one embodiment of the invention, the system further comprises multiple receiver branches wherein the mitigation of the effect of spurious tones is performed in each of the branches.

In one embodiment of the invention, the system further comprises a primary and a secondary clock for the digital-analog converter of the transmitter, with either one of the clocks in operation, and if the controller detect a spurious tone in the spectrum, the controller is configured to switch between the primary and the secondary clocks.

According to yet another aspect of the invention, it comprises a system for mitigating effects of spurious tones caused by clock signals in a transceiver. The system comprises a transmitting signal branch, at least one receiving signal branch, at least one clock signal relating to an analog-digital, digital-analog and/or a sample rate converter of the transceiver, and controlling means configured to determine the at least one clock signal which contributes to a creation of at least one spurious tone on a receiver signal path. The controlling means are configured to select a frequency of the determined clock signal to mitigate the effect of spurious tones in operation of the receiver.

According to yet another aspect of the invention, it comprises a computer program for mitigating effects of spurious tones caused by clock signals in a transceiver comprising a transmitter and a receiver. The computer program comprises code adapted to perform the following steps when executed on a data-processing system:

determining at least one clock signal which contributes to a creation of at least one spurious tone on a receiver signal path, at least one determined clock signal relating to an analog-digital, digital-analog and/or a sample rate converter of the transceiver; and selecting a frequency of the determined clock signal to mitigate the effect of spurious tones in operation of the receiver.

In one embodiment of the invention, the computer program is stored on a computer readable medium.

DETAILED DESCRIPTION OF THE EMBODIMENTS

Reference will now be made in detail to the embodiments of the present invention, examples of which are illustrated in the accompanying drawings.

The present invention discusses a method and an apparatus for mitigating effects created by interferences originating from digital clocks in the transmitter. Especially, the invention applies to clock signal(s) which define the operation of the digital-to-analogue converter (DAC). Furthermore, any clock giving the input to ADCs or DACs in the transceiver or the clock for a sample rate converter in the transceiver, may be determined and its frequency may be reselected in order to mitigate the effect of interferential spurious tones in the receiver.

Digital clock signals comprise a fundamental frequency and also harmonic components at multiples of the fundamental frequency. The level of each harmonic component decreases as a function of an increasing order of the harmonic component. Because the receiver signal path contains high amplification in order to amplify weak wanted signals (typically implemented as high gain of the LNA 15b), even the interfering spurious tones will be amplified. While the harmonic components, which couple undesiredly on the receiving antenna's passband, typically have a low amplitude, the amplified harmonics may have a notable and even significant effect for the signal detection, and degrade the received signal quality.

Figure 1:
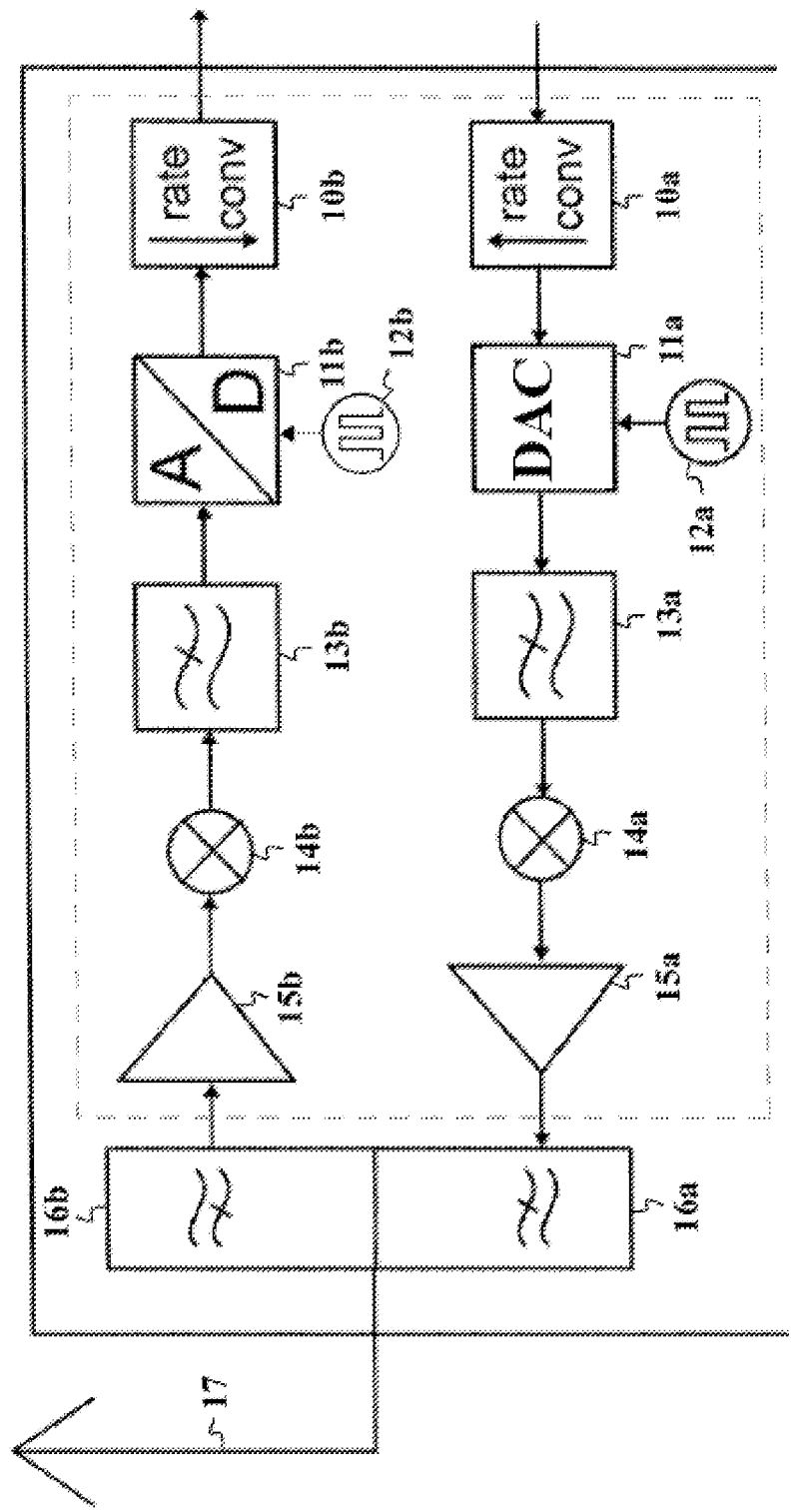
FIG. 1 illustrates a general structure of the RF parts of the transceiver signal branches according to prior art.
Figure 2:
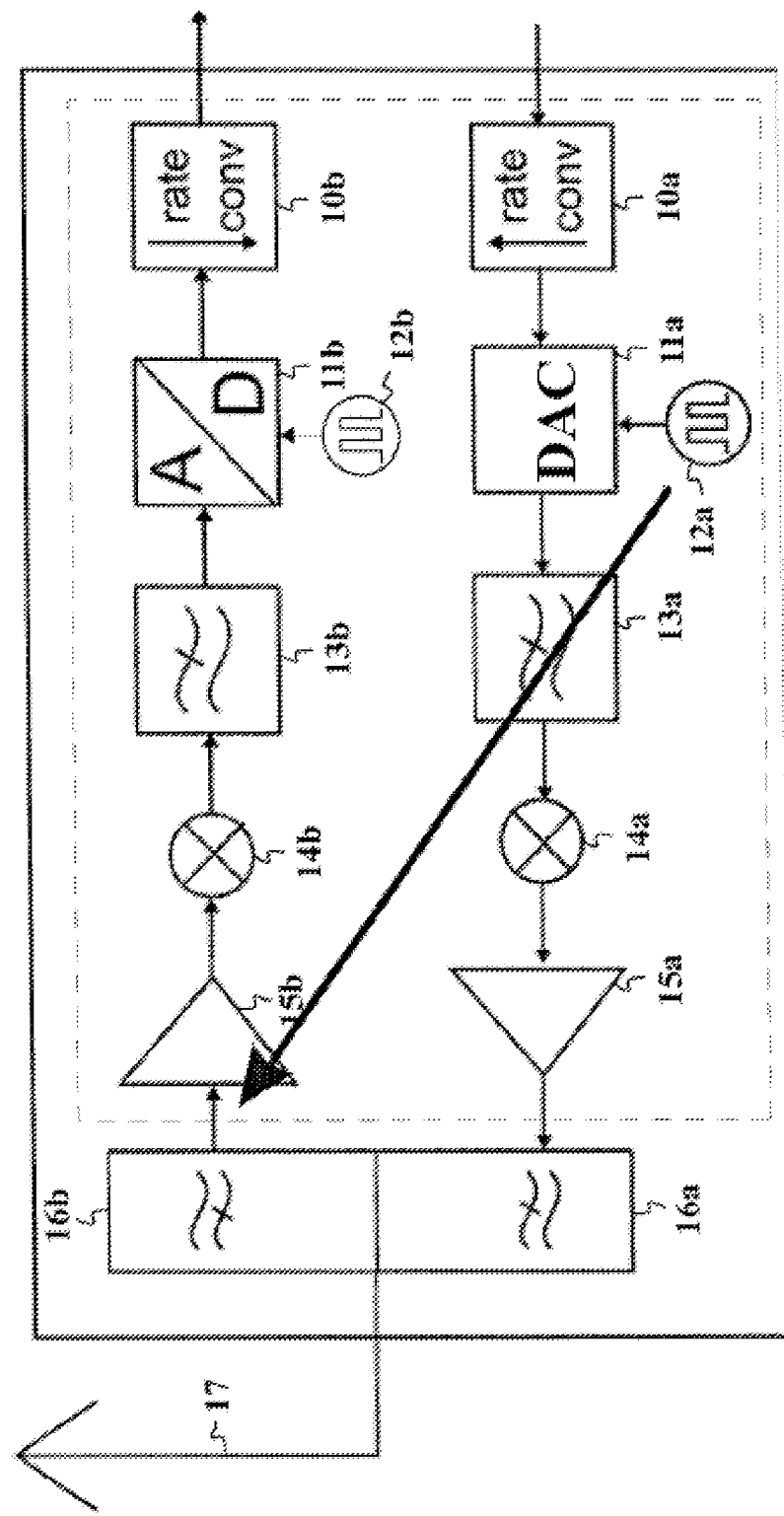
FIG. 2 illustrates an exemplary phenomenon in the RF module of the transceiver which is tackled by the present invention.

Such a phenomenon is shown in FIG. 2 which has practically the same operational RF modules as was described in FIG. 1 earlier. A direction of unwanted coupling from the DAC input clock signal to the receiving signal branch is depicted by an arrow. Such coupling could happen by many different manners, e.g. by magnetic coupling, through ground wirings or through propagation in the substrate material. The DAC input clock is a main source for such spurious tones but the invention may also handle other clocks which feed any DAC, ADC or sample rate converter (up- or down-sampler) in either the transmitting or receiving signal branch.

Regarding LTE Advanced (LTE-A) system operation and specific RF frequency bands allocated for it, following exemplary values enlighten the situation. If the clock 12a defining the operational frequency of the DAC 11a is chosen to operate at 38.4 MHz, its 56$^{th}$ harmonic component will locate at frequency 2150.4 MHz. By looking at standardized LTE receiving frequency bands (e.g. Holma, Toskala: "LTE for UMTS: Evolution to LTE-Advanced", p. 376), receiving band no. 1 is specified between 2110-2170 MHz in the FDD duplex mode. The 56$^{th}$ harmonic component from the DAC clock will fall into this receiving band and degrade the reception quality.

Figure 3:
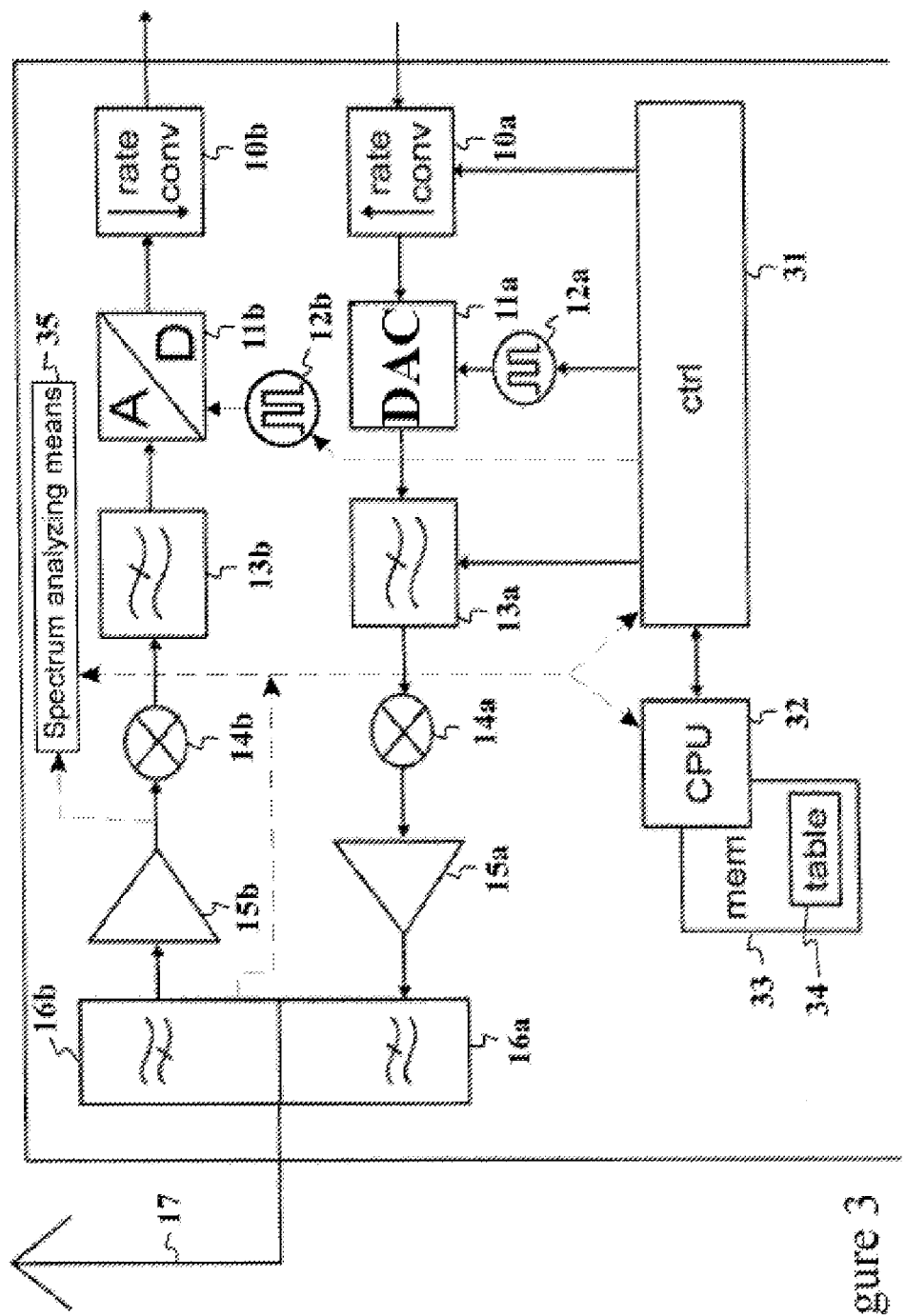
FIG. 3 illustrates the clock signal frequency selection in one embodiment of the invention.

In the following, we refer to FIG. 3 showing a few additional functional units regarding the control method of at least one clock frequency. In an embodiment of the invention, at first at least one clock signal, which contributes to a creation of at least one spurious tone on a receiver signal path, is determined. Such a determined clock or several clocks may relate to an analog-digital, digital-analog and/or a sample rate converter of the transceiver. In the FIGS. 2 and 3, it is shown that the determined clock is the input clock signal for the D/A converter in the RF parts of the transmitter.

The determination may be done by a controller 31 shown in FIG. 3. The controller is further driven by a Central Processing Unit (CPU, 32). Furthermore, appropriate memory units or modules 33 and at least one data table 34 saved in the memory 33, are applied and also in connection with the CPU. An embodiment describing the data table 34 is handled later.

After the correct clock (or clocks), which produces spurious tone(s) in the receiver, has been tracked, the controller 31 selects a frequency of the determined clock signal to mitigate the effect of spurious tones in the operation of the receiver. This may be done as a selection among a plurality of possible frequency value options or by tuning the frequency freely along its operating range. In this embodiment, the frequency of the clock signal 12a is selected or tuned so that created harmonic multiples of the selected or tuned fundamental frequency fall outside any receiving band which is configured by the duplex filter 16b for use in the receiver. In one embodiment, such an effect is implemented by at first checking the received channel information by a measurement 35. Such a measurement 35 can be an originally implemented measurement function along the receiving signal path or an additional spectrum sensing module which is capable to work like a spectrum analyzer in the receiver.

For instance, if the LTE receiving band no. 1 is chosen for the receiver, the bandwidth 2110-2170 MHz is taken to the controller 31 as input data. As one example of a solution according to the embodiment of the invention, the controller 31 decides that the DAC 11a clock frequency should be 70.2 MHz. For this clock frequency, the 30$^{th}$ harmonic component of the frequency will locate at 2106.0 MHz and the 31$^{st}$ harmonic at 2176.2 MHz. When using LTE receiving band no. 1, the band 2110 . . . 2170 MHz will then be free from the clock signal harmonics. The above calculation can be performed by the CPU 32, together with a database saved in the memory 33, e.g. in a form of a data table 32. Such a data table 34 may comprise possible clock frequencies with their most common and receiverspecific harmonics in a table form. The extent (size) of the data table may be determined by the user. Furthermore, the data table 34 can comprise data of mixing products of any two clocks which can act as possible sources of interference. If the first clock has a frequency $f_1$ and the second clock has a frequency $f_2$, the database may comprise frequency values $mf_1+nf_2$ as a function of $f_1$ and $f_2$ together with m and n, where m and n are positive integers.

In an embodiment of the invention, based on the used received signal band and the data of the database 34, the sampling rate 10a at the transmitter is selected by the controller 31. In one embodiment, the rate of the sampling rate converter 10a is an integer fraction of the rate of the DAC 11a.

In one embodiment of the invention, the low-pass filter 13a right after the TX DAC 11a can also be configured in a desired manner. This means that the filter 13a may be configured to have a notch in a frequency where a harmful generated harmonic component locates. One option is to design such a frequency response for the filter 13a that the most crucial clock harmonic components are sufficiently attenuated by the filter 13a. Such a procedure with analog filtering naturally requires that the path of the harmonic component would propagate along the TX signal wiring through the filter 13a.

In one embodiment of the invention, the clock signal generator 12a comprises a programmable divider. The clock signal frequency may be generated according to formula f/n where n is an integer value. The divider is programmed by the controller 31, acting together with the CPU 32 and if necessary, the database 34 of the memory 33. In one embodiment, the output of the divider is connected to the sample rate converter 10a.

In one embodiment of the invention, the sampling rate converter 10a is a Farrow type resampler. Such a technique is known as such (see e.g. Fred Harris: "Performance and design of Farrow filter used for arbitrary resampling", San Diego State University).

According to an embodiment of the method, the presence of a possible interference, which can typically be noted as at least one spurious tone in the received signal, is examined by spectrum analyzing means 35. The examination may be done in frequency domain analysis in the received RF analog signal branch, for example after the LNA 15b as shown in FIG. 3. The measurement may also be performed by an internal measurement circuit, module or function originally implemented in the receiver. Whatever the means for achieving data of spurious tones in the received signal, the spectrum analyzing means 35 may sense one or more spurious tones, whose levels are significantly high compared to the signal as expected. A threshold may be set for the amplitude where the measured amplitudes exceeding the threshold and their corresponding frequencies are picked and sent to the controller 31 and the CPU 32.

At the next step of this embodiment, the controller 31 needs to determine the clock or clocks which actually contribute to the emerged spurious tone(s). As already mentioned above, the spurious tones have a frequency following the form:

$$f_{spurious} = a \cdot f_{clock1} + b \cdot f_{clock2} + c \cdot f_{clock3} + \quad (1)$$

In case the spurious tone is a result of a harmonic of a single clock, it is easy to determine the contributing clock by checking whether the following fraction results in a value substantially close to an integer value:

$$a = \frac{f_{spurious}}{f_{clock1}} \quad (2)$$

The controller 31 may use the database 34 for helping to find a contributing clock or clocks 12a, 12b. In case there are two possible contributing clocks 12a, 12b, the database 34 may contain possible spurious tone frequency values:

$$f_{spurious} = a \cdot f_{clock1} + b \cdot f_{clock2} \quad (3)$$

for integer values $1 < a < N$ and $1 < b < N$ where N is a desired harmonic order threshold. If the measured spurious tone frequency coincides with any value $f_{spurious}$ of the database 34, it can be seen that the contributing clocks are really "clock1" and "clock2".

Once the contributed clock signal generator(s) are known, the method according to the invention will configure the at least one contributing clock signal generator by selecting a suitable frequency for the clock signal(s). In one embodiment, the selection may be done together with reconfiguring the sample rate conversion for the sampling rate converter 10a. For example, the sample rate conversion may be implemented by a Farrow-type interpolator which is discussed earlier. In one embodiment, for configuring the at least one contributing clock signal generator, also transmitting and/or receiving signal path parameters may be changed. This can be done by tuning appropriate filter properties.

In one embodiment of the invention, multiple receiver branches may be applied. The measurement can be performed for each of the receiver branches individually. Also the clock frequency selection may be performed so that for every receiver branch passband, there is no spurious tones present in any of the branches of the multiple branch receivers. This requires a more complicated procedure from the CPU 32 and the controller 31 but the database 34 can be expanded in order to comprise the relevant frequency data for all the receiver branches and for all the relevant ADC and DAC clocks.

In yet another embodiment of the invention, a primary and a secondary clock can be available for the DAC 11a. In an example, the primary TX clock frequency can be defined as 52 MHz. The secondary TX clock can be defined having a frequency of 49.92 MHz. Multiple receiver branches (possibly even multiple standards such as GSM, WLAN, etc.) can be applied in the system. Each receiver branch can contain means or algorithm for determining, whether the primary Tx clock causes any harmonics into current RX channel. In case that happens, the receiver branch requests, through the controller, that the secondary TX clock is taken into use. One option is to choose the secondary TX clock in use if at least one receiver (or receiver branch) requests it from the controller. This feature can be implemented by a common wire (with a logical "or") that is pulled down by any receiver to request the secondary Tx clock in use.

Figure 4:
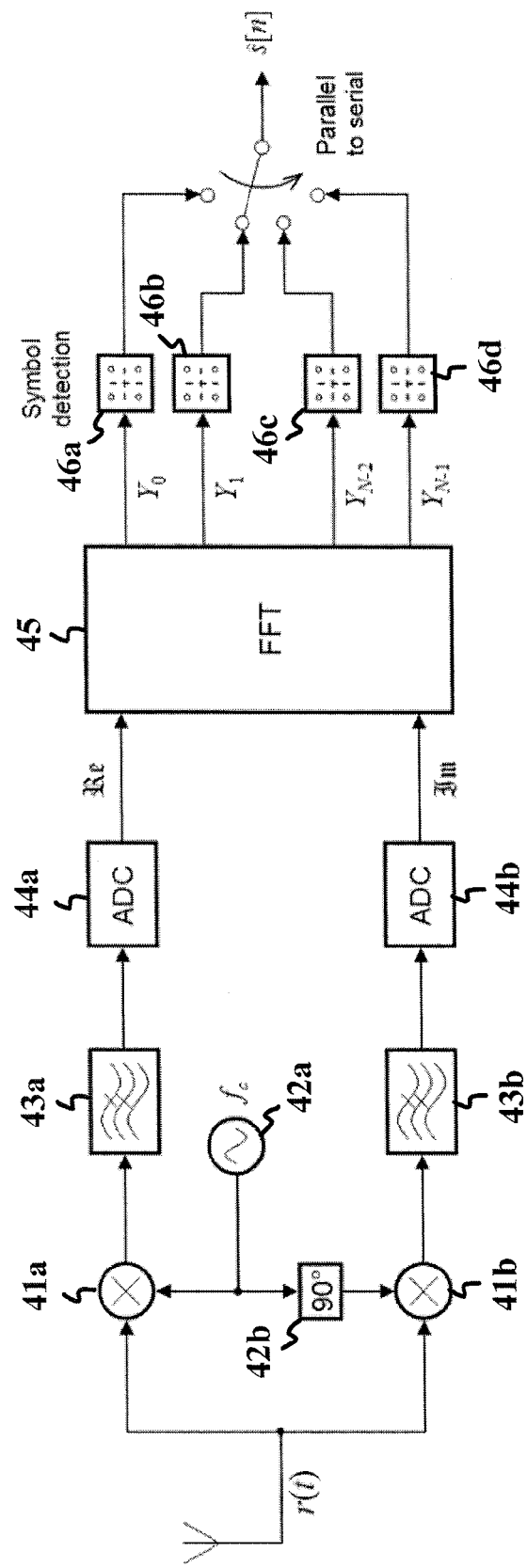
FIG. 4 illustrates an OFDM system, used in one embodiment of the invention.

According to another aspect and to another embodiment of the invention, we consider an Orthogonal Frequency-Division Multiplexing (OFDM) transceiver. In an OFDM system, data is carried by several orthogonal subcarriers which are equidistantly spaced in the frequency domain. A general structure of an OFDM receiver is shown in FIG. 4. The received signal r(t) is quadrature-mixed 41a-41b down using the carrier signal $f_c$ 42a and the phase shifter 42b. The resulting signals are further low-pass filtered 43a-43b and converted to digital signal by A/D converters 44a-44b. The resulting signal parts (seen as real and imaginary parts) are fed to a Fast Fourier Transform (FFT) converter 45 which transforms the time domain input signal into a frequency domain signal. The outputs $Y_0, Y_1, \ldots$ 46a-46d comprise parallel signal streams, each corresponding to a subcarrier of the OFDM system. Symbols are detected and the resulting symbols are placed in a desired order (corresponding to the TX processing) for achieving a received symbol stream $\hat{s}[n]$.

Regarding interferences in the OFDM receiver, in case there is an interfering signal component locating between the FFT output's subcarrier frequencies, the effect on the symbol detection quality is significant. However, if there is an interfering component which has substantially the same frequency as any of the subcarrier frequencies, the effect is much smaller. Therefore, in case there is a tuning possibility for the frequency of the interfering signal, it is beneficial to tune the interference source frequency (TX clock) so that it overlaps with one of the carrier frequencies.

According to an aspect of the present invention, this may be done by measuring the signal after the FFT conversion. If any of the amplitudes of the subcarriers show a clearly non-typical level, or if there is an additional signal peak between the subcarrier signals, the system decides there is an interfering signal (spurious tone) present in the receiver chain. In the latter case, the interfering effect for the signal quality would be notable. It is assumed that in this case, a TX clock or several clocks 12a, 12b in the transceiver are the source for the emerging interference signal peak. Thereafter, the controller 31 may decide which clock(s) contributes to the emerging interference. Furthermore, the controller may pick a suitable subcarrier frequency and calculate $$f_{clock,tuned} = \frac{f_{subcarrier}}{N} \quad (4)$$

where N is the order of the clock harmonic and $f_{clock,tuned}$ needs to be within the possible range of the clock signal so that the DAC 11a performs the sampling rate conversion as desired.

The needed frequency for the clock signal may also be determined with a help of the database 34 (disclosed earlier) which consists of possible clock frequencies and their harmonic components e.g. in a data table form. If it is possible to pick a DAC clock signal 12a in the way that its Nth harmonic substantially coincides with a RX signal subcarrier frequency, such a clock frequency is applied in use for interference effect mitigation by the controller 31.

In yet another aspect and embodiment, regarding the detection of an interfering spurious tone in the received signal in general, it can be implemented in the following way. At first, at least one test frequency can be chosen for the receiver which could represent a potential spurious tone frequency in the received signal. For the test frequency (or plurality of them), a measure of signal quality is then defined for a RX signal subcarrier. The test frequencies may be of the form (1) from above, by choosing suitable values for a, b, c, etc. The signal quality measure may be an error vector magnitude. Also, an average signal quality may be measured over a longer time period and/or based on measurements on plurality of subcarriers. Optionally, the average signal quality value can be manually fed to the controller 31, for instance. Furthermore, based on the average signal quality, a threshold for poor signal quality is selected. It can be calculated or determined by the controller 31, or fed manually by a user. In case the measured signal quality at the test frequency for the subcarrier is below the poor signal quality threshold, the system decides that a spurious tone is present substantially at the test frequency. The reconfiguration of the clock signal (selection of the clock frequency) can be done after that as already explained above. Possibly, after the reconfiguration, the above test may be reperformed in order to be sure that the signal quality is good for the whole applied RX bandwidth, that is, without any clock originating spurious tones in the receiver signal.

In yet another embodiment, the controller 31 may decide that the interfering clock signal source is the clock 12b for the A/D converter 11b in the receiving signal path. The ADC clock 12b may create the spurious tones by its own or together with the clock 12a as mixing products. The controller 31 may select the frequency of clock 12b in the similar manner as described above. Also the database 34 may be used in a similar manner for clock frequency selection for 12b as for clock 12a.

An obvious advantage of the invention is that transmitter clock harmonics are efficiently avoided from the operational receiver bands. Therefore, the reception quality is significantly improved. Also, for the design phase, it mitigates subsequent problems which could otherwise occur because of the emerging spurious tones. Furthermore, when the spurious tones no longer pose a big problem for the design of the RF module, simpler and thus cheaper packaging solutions may be used for the transceiver circuitry.

In an embodiment, the method steps and the system according to the invention can be implemented by at least one separate or embedded hardware module in at least one device of the radio communication network. In one embodiment, the functionalities are implemented in a chipset in at least one device of the system.

In an embodiment, the method according to the invention can be implemented with one or several computer programs which can be executed by at least one processor or controller. The computer program(s) can be stored on at least one computer readable medium such as, for example, a memory circuit, memory card, magnetic or optical disk. Some functional entities may be implemented as program modules linked to another functional entity. The functional entities may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware arts. For example, the functionality of one or more of the compovents of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical arts.

As stated above, the components of the exemplary embodiments can include computer readable medium or memories according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present invention are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:
1. A method for mitigating effects of spurious tones caused by clock signals in a transceiver, comprising a transmitter and a receiver, the method comprising:
   determining at least one clock signal which contributes to a creation of at least one spurious tone on a receiver signal path, at least one determined clock signal relating to at least one of an analog-digital converter, a digital-analog converter and a sample rate converter of the transceiver;

measuring a spectrum of a received signal on the receiver signal path; and if detecting a spurious tone in the spectrum, selecting a frequency for the determined clock signal based on the detected spurious tone to mitigate the effect of spurious tones in operation of the receiver, wherein the detecting of the spurious tone comprises detecting an increase in power spectral density at a frequency that falls substantially on a multiple of a the frequency of for the determined clock signal.

2. The method according to claim 1, where the frequency for the determined clock signal is selected so that the created spurious tone falls outside a bandwidth of the receiver.

3. The method according to claim 1, where the frequency for the determined clock signal is selected so that the created spurious tone falls substantially aligned with a subcarrier frequency of the receiver.

4. The method according to claim 1, wherein determining the at least one clock signal comprises:

determining at least two clock signals whose linear combination fall substantially on a frequency of the spurious tone.

5. The method according to claim 1, wherein determining the at least one clock signal comprises:

determining the at least one clock signal based on a data table, comprising clock signal frequency values linked with at least one of created spurious tone frequency values, subcarrier frequencies and limit frequencies of a passband of the receiver.

6. The method according to claim 1, wherein a clock frequency of a Farrow-type sample rate converter is related to the clock frequency of the digital-analog converter.

7. The method according to claim 1, wherein the mitigation of the effect of the spurious tones is performed in each branch of a multiple branch receiver.

8. The method according to claim 1, wherein the transmitter comprises a primary and a secondary clock for the digital-analog converter, with either one of the clocks in operation; and if detecting a spurious tone in the spectrum, switching between the primary and the secondary clocks.

9. A system for mitigating effects of spurious tones caused by clock signals in a transceiver, comprising:

a transmitting signal branch;
at least one receiving signal branch;
at least one clock signal relating to at least one of an analog-digital converter, a digital-analog converter and a sample rate converter of the transceiver;
a controller configured to determine the at least one clock signal which contributes to a creation of at least one spurious tone on the receiving signal branch;
the controller configured to select a frequency for the determined clock signal to mitigate the effect of spurious tones in operation of the receiver;
measuring means configured to measure a spectrum of a received signal on the receiver signal path, wherein, if the controller detects a spurious tone in the spectrum, the controller selects the frequency for the determined clock signal based on the detected spurious tone; and
the controller configured to detect an increase in power spectral density at a frequency that falls substantially on a multiple of a frequency of for the determined clock signal, when detecting the spurious tone.

10. The system according to claim 1, the system comprising:

the controller configured to select the frequency for the determined clock signal so that the created spurious tone falls outside a bandwidth of the receiver.

11. The system according to claim 9, the system comprising:

the controller configured to select the frequency for the determined clock signal so that the created spurious tone falls substantially aligned with a subcarrier frequency of the receiver.

12. The system according to claim 9, the system comprising:

the controller configured to determine at least two clock signals whose linear combination fall substantially on a frequency of the spurious tone.

13. The system according to claim 9, the system further comprising:

a memory storing a data table; and
the controller configured to determine the at least one clock signal based on the data table, comprising clock signal frequency values linked with at least one of created spurious tone frequency values, subcarrier frequencies and limit frequencies of a passband of the receiver.

14. The system according to claim 9, the system comprising:

a Farrow-type sample rate converter whose clock frequency is related to the clock frequency of the digital-analog converter.

15. The system according to claim 9, the system comprising:

multiple receiver branches wherein the mitigation of the effect of spurious tones is performed in each of the branches.

16. The system according to claim 9, the system further comprising:

a primary and a secondary clock for the digital-analog converter of the transmitter, with either one of the clocks in operation; and
if the controller detects a spurious tone in the spectrum, the controller is configured to switch between the primary and the secondary clocks.

17. A non-transitory computer-readable medium comprising a computer program for mitigating effects of spurious tones caused by clock signals in a transceiver comprising a transmitter and a receiver, the computer program comprising code adapted to perform the following steps when executed on a data-processing system:

determining at least one clock signal which contributes to a creation of at least one spurious tone on a receiver signal path of the receiver, the at least one determined clock signal relating to at least one of an analog-digital converter, a digital-analog converter and a sample rate converter of the transceiver;
measuring a spectrum of a received signal on the receiver signal path; and
if detecting a spurious tone in the spectrum, selecting a frequency for the determined clock signal based on the detected spurious tone to mitigate the effect of spurious tones in operation of the receiver,
wherein the detecting of the spurious tone comprises detecting an increase in power spectral density at a frequency that falls substantially on a multiple of a the frequency of for the determined clock signal.

18. The non-transitory computer-readable medium according to claim 17, where the frequency for the determined clock signal is selected so that the created spurious tone falls outside a bandwidth of the receiver and/or falls substantially aligned with a subcarrier frequency of the receiver.

19. The non-transitory computer-readable medium according to claim 17, wherein determining the at least one clock signal comprises:
   determining at least two clock signals whose linear combination fall substantially on a frequency of the spurious tone.

20. The non-transitory computer-readable medium according to claim 17, wherein determining the at least one clock signal comprises:
   determining the at least one clock signal based on a data table, comprising clock signal frequency values linked with at least one of created spurious tone frequency values, subcarrier frequencies and limit frequencies of a passband of the receiver.

* * * * *

UNITED STATES PATENT AND TRADEMARK OFFICE
CERTIFICATE OF CORRECTION

PATENT NO. : 8,750,350 B2  Page 1 of 1
APPLICATION NO. : 13/183528
DATED : June 10, 2014
INVENTOR(S) : Nentwig It is certified that error appears in the above-identified patent and that said Letters Patent is hereby corrected as shown below:

In the Claims

Column 11, lines 11-13, claim 1, replace "density at a frequency that falls substantially on a multiple of a the frequency of for the determined clock signal" with --density at a frequency that falls substantially on a multiple of the frequency of the determined clock signal--.

Column 11, lines 65-67, claim 9, replace "density at a frequency that falls substantially on a multiple of a frequency of for the determined clock signal" with --density at a frequency that falls substantially on a multiple of the frequency of the determined clock signal--.

Column 12, line 1, claim 10, replace "according to claim 1" with --according to claim 9--.

Column 12, lines 62-64, claim 17, replace "density at a frequency that falls substantially on a multiple of a the frequency of for the determined clock signal" with --density at a frequency that falls substantially on a multiple of the frequency of the determined clock signal--.

Signed and Sealed this
Sixteenth Day of December, 2014

Michelle K. Lee
*Deputy Director of the United States Patent and Trademark Office*